July 7, 1953  A. G. BRENDEL  2,644,516
APPARATUS FOR SPRAY DRYING
Filed July 21, 1949  5 Sheets-Sheet 1

INVENTOR
ARMIN G. BRENDEL,
BY
Wm. P. Spielman
ATTORNEY

July 7, 1953 — A. G. BRENDEL — 2,644,516
APPARATUS FOR SPRAY DRYING
Filed July 21, 1949 — 5 Sheets-Sheet 3

INVENTOR
ARMIN G. BRENDEL,
BY
Wm. P. Spielman
ATTORNEY

July 7, 1953 A. G. BRENDEL 2,644,516
APPARATUS FOR SPRAY DRYING
Filed July 21, 1949 5 Sheets-Sheet 5

INVENTOR
ARMIN G. BRENDEL,
BY
Wm. P. Spielman
ATTORNEY

Patented July 7, 1953

2,644,516

UNITED STATES PATENT OFFICE 2,644,516

APPARATUS FOR SPRAY DRYING

Armin G. Brendel, Suffern, N. Y., assignor to American Cyanamid Company, New York, N. Y., a corporation of Maine Application July 21, 1949, Serial No. 105,943

4 Claims. (Cl. 159—4)

This invention relates to an apparatus and process for drying solid material dissolved or suspended in a liquid. The principal object of the invention is to provide a method and apparatus for this purpose which will produce a spray dried product of fine particle size and, if desired, of improved spericity. A still further object is to provide a spray drying method and apparatus which can be operated at very high capacity. Another object is the provision of a spray drying apparatus that can be constructed in units of large size, with a corresponding reduction in cost per pound of spray dried material. Other objects will become apparent from the following detailed description of a preferred embodiment of the invention when taken with the appended claims.

Although not limited thereto, the process and apparatus of the invention are particularly well adapted for the spray drying of slurries containing gelatinous silica, including silica-alumina, silica-magnesia and silica-alumina-magnesia compositions for use in the catalytic cracking of petroleum hydrocarbons. For this reason the invention will be described in detail with particular reference to the spray drying of this class of materials; it being understood however, that slurries or solutions of other solid or semi-solid material may be dried therein.

In the spray drying of silica slurries for the production of microspheroidal cracking catalysts a two-phase slurry consisting of water containing small globules of hydrated silica, silica-alumina, silica-magnesia and the like is dispersed into a current of hot gases in a spray drying chamber. Usually the slurry is dispersed by discharging it onto a rapidly rotating vaned spray wheel mounted in the top of the drying chamber. A current of hot gases, such as hot products of combustion, is admitted tangentially at the periphery of the chamber and forms a rotating vortex into which the spray of silica slurry is projected by centrifugal force. In a process of this type the evaporation of the water or other liquid component of the slurry takes place solely by the sensible heat of the gases, so that these gases are rapidly cooled. The drying capacity of the apparatus is therefore limited by the amount of heat that can be introduced in the drying gases.

In accordance with the present invention the spray of material to be dried is subjected to radiant heat as well as to the sensible heat of the gases, whereby a number of improvements are obtained. I have found that by introducing radiant heat into the top of the spray drying chamber, where the major part of the water evaporation takes place and the solid material assumes its final form, a much faster drying rate is achieved. This results in the formation of microspheres of improved sphericity and smaller average particle size; it also increases the capacity of the apparatus so that a greater quantity of spray dried material can be produced in an apparatus of any given size per unit of time. Furthermore, the introduction of radiant heat over the entire top surface of the spray drying chamber has enabled me to obtain a dried product of uniformly small particle size in apparatus of relatively large diameter, with a further increase in drying capacity. By so increasing the diameter of the spray drying chamber, I am enabled to employ a motor for the spray wheel of more than twice the power of those that have previously been used, with a corresponding increase in the amount of slurry that can be dispersed and spray dried per unit of time.

In addition to the above operating advantages, certain structural advantages in the design of the spray drying equipment are also obtained by the present invention. Principal among these is the simplification and elimination of duct work that results from mounting the furnace on the top of the spray drying chamber. While I am not the first to suggest the location of a furnace in this position (see U. S. Patent No. 1,782,822 to Hechenbleikner), my present construction retains all of the advantages pointed out in the Hechenbleikner patent and also presents further improvements resulting in the increased drying rate and finer particle size of the spray dried product noted above.

The invention will be further described with reference to the specific embodiment thereof shown in the attached drawings in which.

Figure 1:
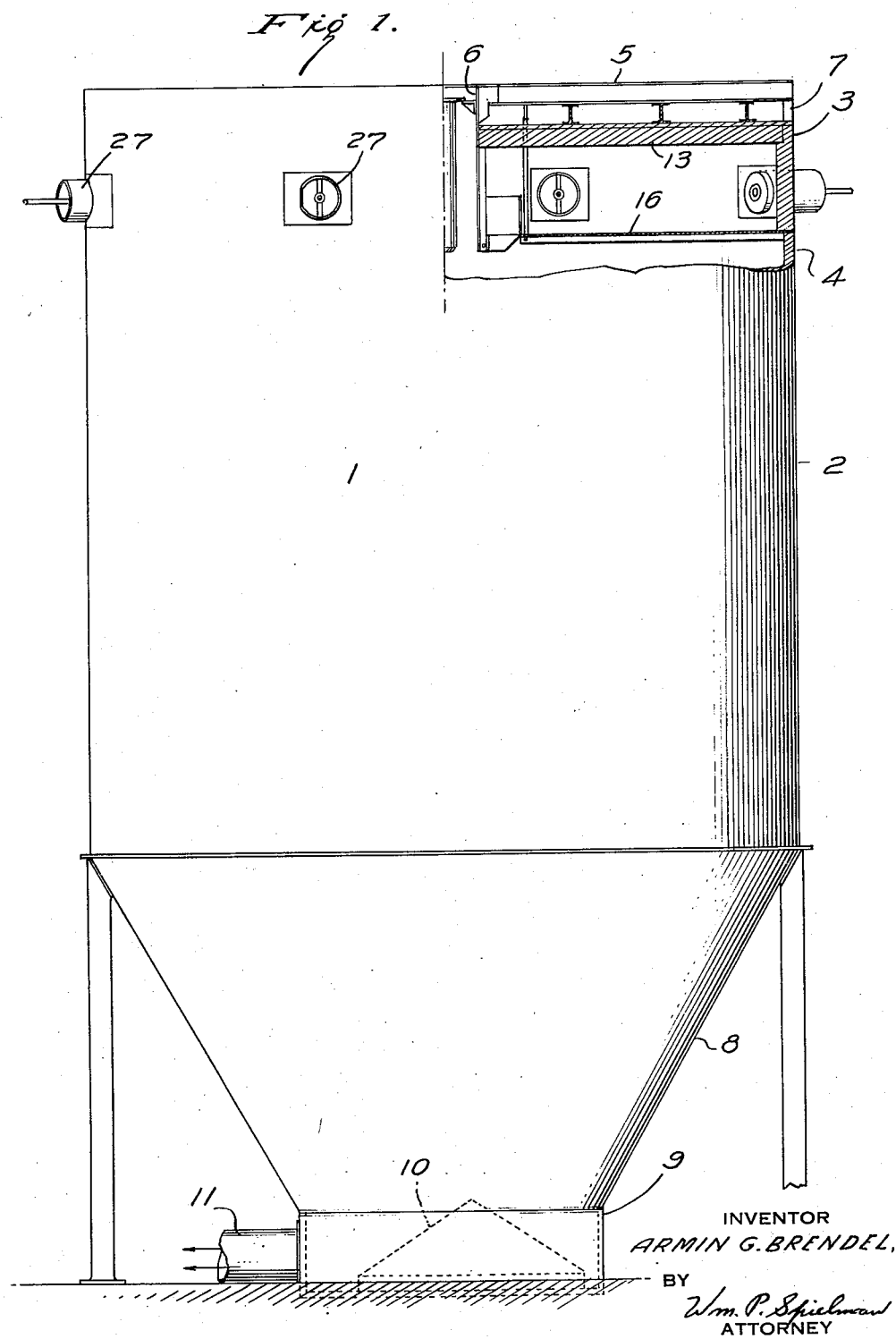
Fig. 1 is a side view of a spray drier and furnace embodying the invention with a portion of the furnace shown in section.
Figure 2:
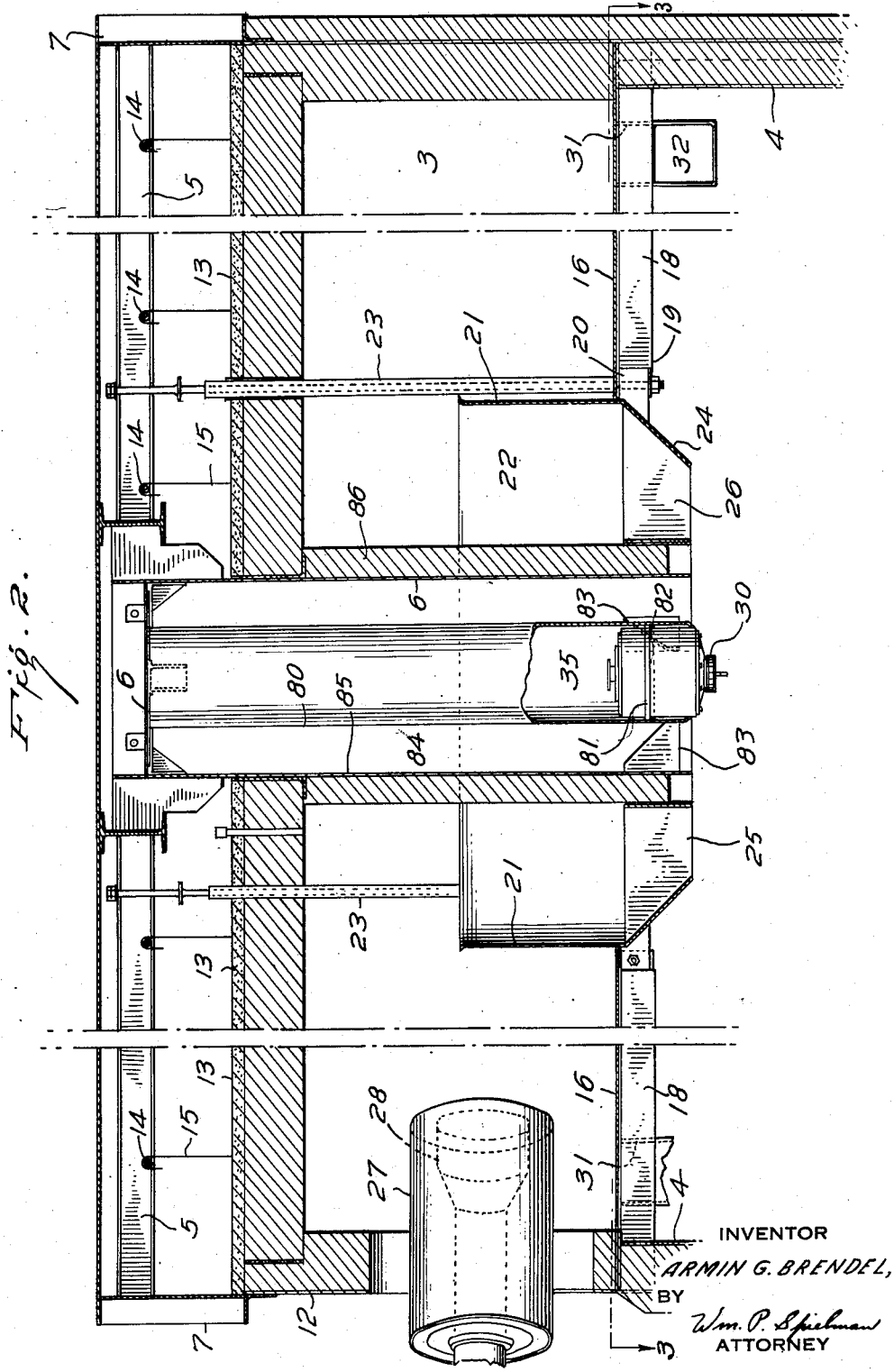
Fig. 2 is a vertical section through the furnace and top portion of the spray drier with parts broken away, the section being taken on the line 2—2 of Fig. 3.

Referring to Figs. 1 and 2 it will be seen that the assembly indicated generally by reference numeral 1 consists of a drying chamber 2 having a furnace 3 superimposed thereon, both being enclosed by a cylindrical side wall 4. Supporting beams 5 carrying a central well structure 6 are mounted on the top of this wall, as by vertical beams 7. The lower portion of the drying chamber is preferably conical, as at 8, and terminates in a cylindrical outlet 9 containing an eccentrically mounted deflecting cone 10 surrounded by a duct 11. This duct leads to a set of centrifugal separators being connected in turn with an exhaust blower for drawing gases through the apparatus. A scrubber irrigated by water sprays may follow the exhaust blower when complete recovery of all of the dried material is desired.

Figure 3:
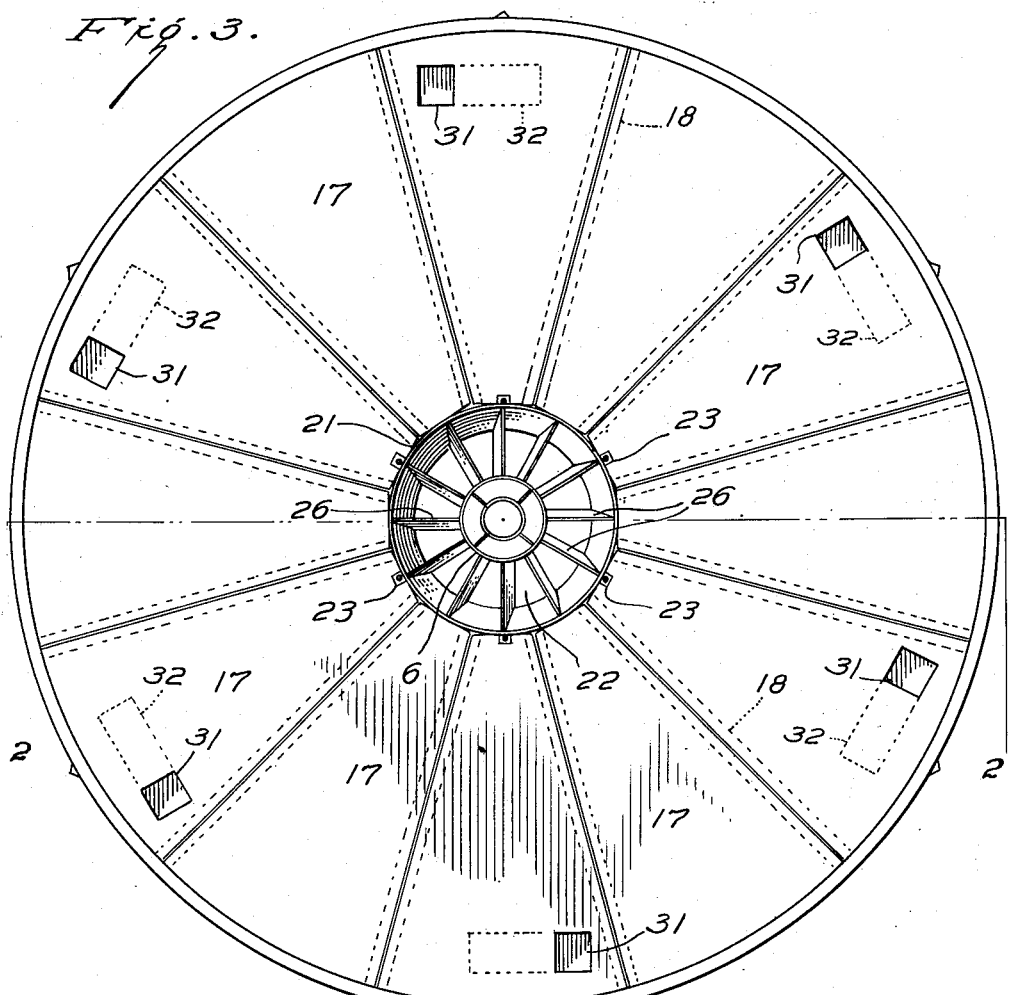
Fig. 3 is a horizontal section on the line 3—3 of Fig. 2 with the motor and spray wheel in raised position.

As is shown most clearly in Figs. 2 and 3 the furnace 3 is formed within the top portion 12 of the side wall 4 by an insulated ceiling 13, which is suspended from the supporting beams 5 by rods 14 and hangers 15, and an imperforate heat-radiating metal partition 16 which constitutes a floor for the furnace and a horizontal ceiling for the spray drying chamber. This metal partition serves the important function of radiating heat from the furnace into the particles of material in the upper portion of the spray drying chamber while preventing the uncontrolled admixture of additional quantities of hot gases therewith, which increases the drying capacity of the apparatus and aids in forming a spray-dried material of controlled shape and particle size.

The partition 16 is made up of a set of metal plates 17 laid on an equal number of radial beams 18 which are supported at their outer ends by the side wall 4. At their inner ends 19 these beams are joined as at 20 to a vertical annular baffle 21, which is spaced outwardly from the central well 6 and forms therewith an annular passage 22. The baffle 21 and the inner ends of the beams 19 are supported by a ring of insulated rods 23 which extend through the ceiling of the furnace and are hung from the supporting beams 5. Near its lower edge, and preferably below the level of the beams 18, the baffle is inclined inwardly at 24 to form a restricted portion 25 in which a set of inclined gas-directing vanes 26 is mounted.

Set in the outer wall 12 of the furnace are a number of burner tunnels 27, each enclosing a gas burner 28. These tunnels and burners are set at an angle between the radius and the tangent to the wall of the furnace, so that the flames from the burners travel through a spiral path. It will be noted from Fig. 2 that the burners are mounted relatively close to the metal floor 16, so that this floor soon becomes very hot and radiates a substantial proportion of the heat from the burners directly into the drying space below. The products of combustion, at the end of their spiral path around the furnace, pass upwardly over the vertical baffle 21 and downwardly through the spaces 22 and 25, being deflected by the vanes 26 into a vertically rotating path.

Figure 4:
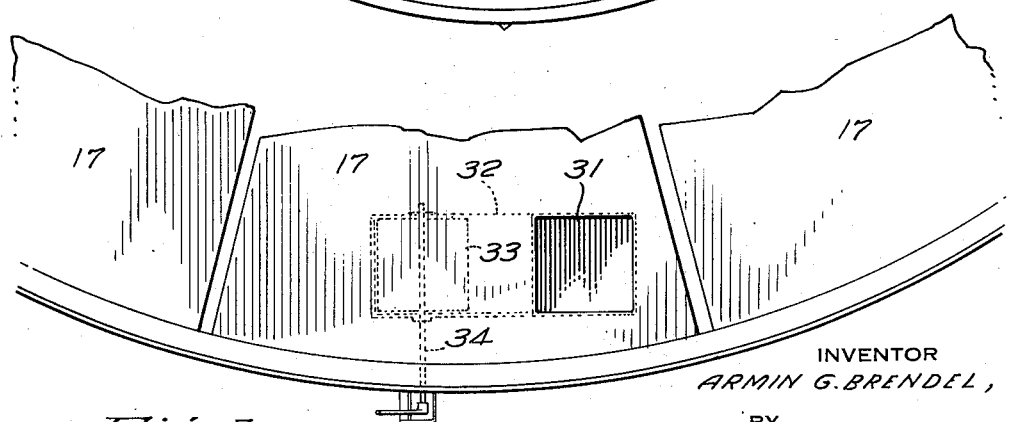
Fig. 4 is an enlarged portion of Fig. 3.

Under some conditions of operation it may be advisable to admit hot gases from the furnace 3 to the peripheral portion of the drying chamber 2. In order to accomplish this purpose a set of supplementary gas passages 31 is provided in the partition 16. Each of these passages is fitted with a connecting pipe 32 containing a damper 33 operating on a rod 34 that extends through the outer wall of the spray drying chamber, so that the damper can be opened, closed or adjusted from outside as is shown in Fig. 4 of the drawings. By suitable operation of these dampers the possibility of a dead air space in the outer upper portions of the spray drying chamber is avoided.

As has been stated, the drying capacity of the apparatus of the present invention is such that a motor can be used having a greater power output than any heretofore employed for this purpose. Such a motor is shown on Fig. 5 of the drawings. While this motor, per se, is more or less conventional in design and is not a part of the present invention, its cooling system and the structure and location of the slurry feed and emergency water distribution pipes, and particularly the distribution plate whereby these are connected with the spray wheel 30, constitute important novel features of the invention.

Figure 5:
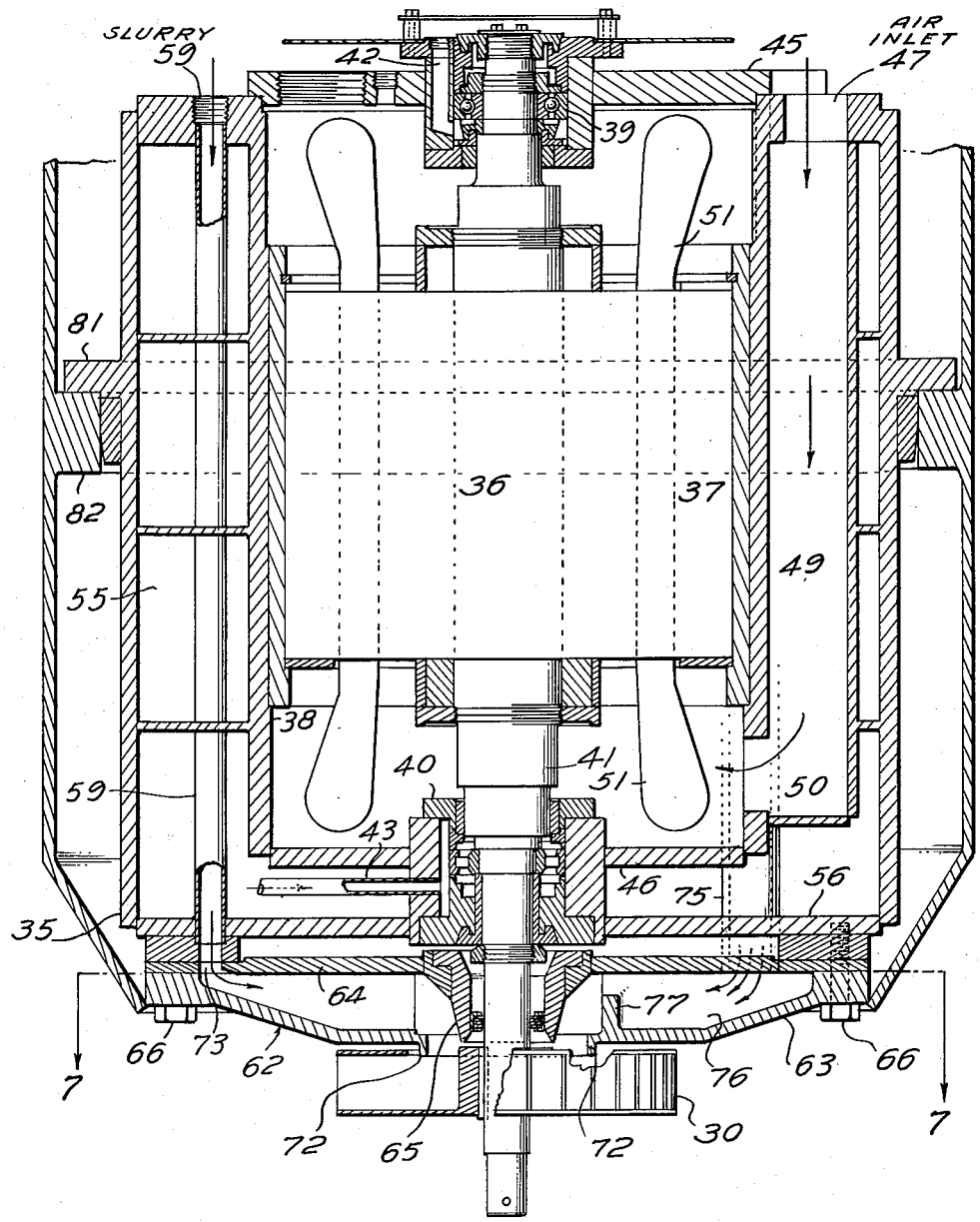
Fig. 5 is a vertical section through the motor and cooling jacket assembly.
Figure 6:
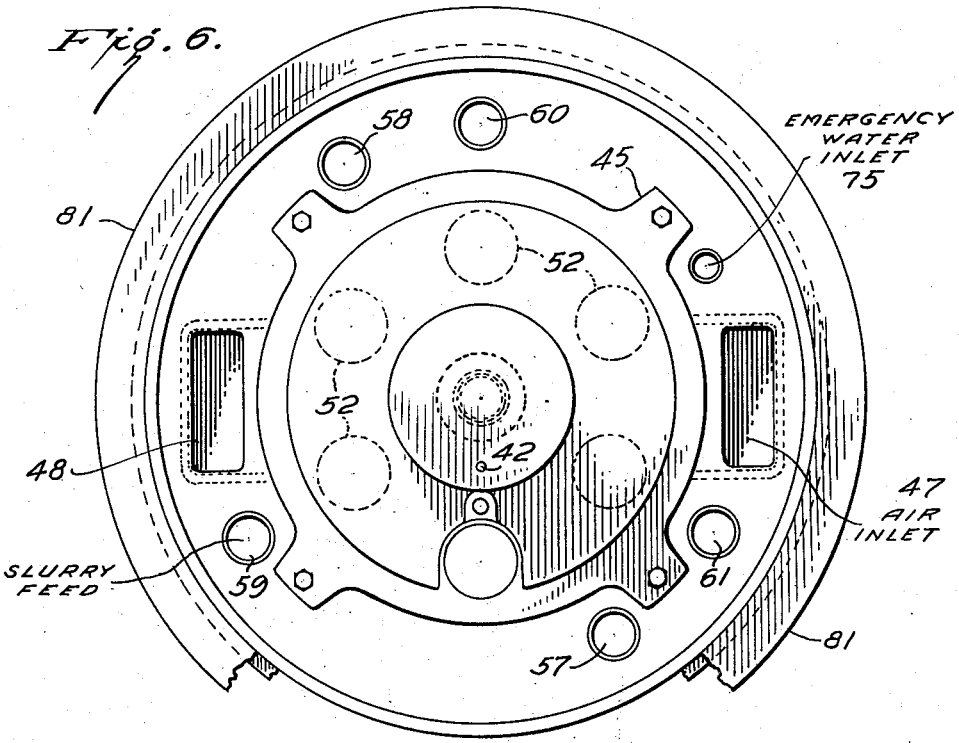
Fig. 6 is a plan view of the top of the assembly of Fig. 5, showing the feed pipes and the pipes of the cooling and lubricating system.

Referring to Fig. 5, the spray machine indicated generally by reference numeral 35 comprises a rotor 36 and a suitable stator 37, both mounted within a water jacketed enclosure 38. The upper and lower bearings 39 and 40 of the rotor shaft 41 are designed for operation at high speeds and are supplied with a spray of oil through pipes 42 and 43 respectively. These bearings are mounted in upper and lower plates 45 and 46, a plan view of the upper plate 45 being shown in Fig. 6 of the drawings. Air ducts 47 and 48 are provided in the enclosure 38, through which air is forced to aid in cooling the motor. One of these air pipes is shown at 49 on Fig. 5, the air being admitted through port 50 and passing over the field 51, through the rotor 36 and out through openings 52 in the upper plate 45. The machine illustrated is a two pole, 3 phase, 150 H. P., 210 cycle motor operated with a frequency generator unit which can vary the frequency up to 260 cycles or down to 158 cycles, thus giving any desired speed to the rotor shaft 41 between 9500 and 15,600 revolutions per minute.

The motor is enclosed by a water jacket 55 having a flat bottom 56 which forms with the lower plate 46 a water passage that surrounds and cools the lower bearings 40. Water inlet and outlet pipes 57 and 58 permit a continuous circulation of water through this jacket, thus protecting the motor from the heat of the furnace in which it operates. Slurry pipes 59, 60 and 61 also pass through the cooling jacket 55 in order to avoid the danger of clogging by premature heating and solidification of the solutions or slurries to be spray dried. These pipes extend through the bottom 56 of the cooling jacket and communicate with the distributor 62, which feeds the materials to be dried to the spray wheel 30.

Figure 7:
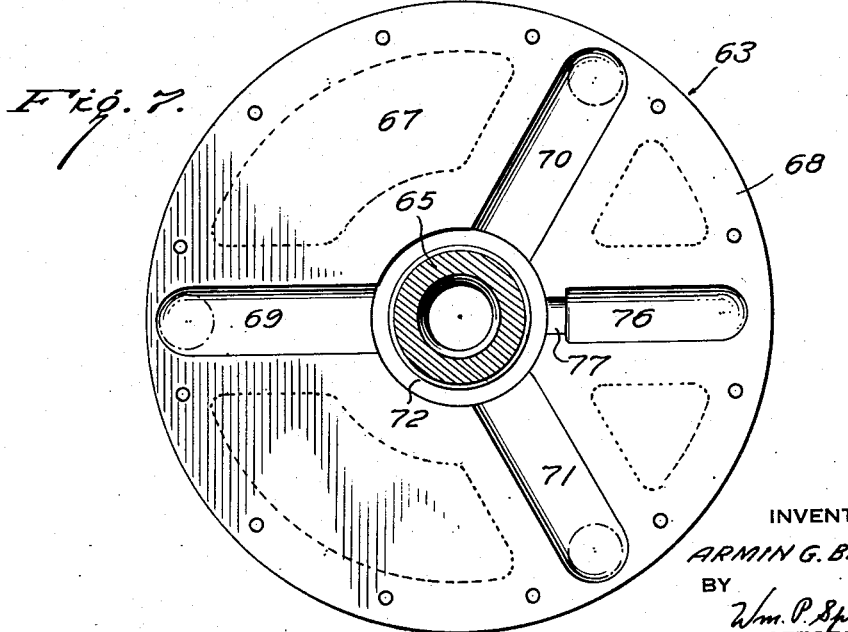
Fig. 7 is a plan view of the slurry and emergency water distribution plate taken on the line 7—7 of Fig. 5.

The distributor 62 is made up of a lower body portion 63 and a cover plate 64 carrying a central annular shield 65, the body portion and cover plate being fastened together and to the cooling jacket by bolts 66. As is shown in Fig. 7 of the drawings the body portion 63 consists of a flat circular plate 67 having a machined outer edge 68 and a set of slurry channels 69, 70 and 71 aligned at their outer ends with slurry pipes 59, 60 and 61 respectively and having a downwardly turned lip, as at 72, at their inner ends. Corresponding openings in the cover plate, as at 73, permit the solution or slurry to be dried to flow through the channels and discharge over the lip 72 onto the spray wheel, which is of a conventional type, from which it is thrown outwardly in the form of fine droplets into the drying chamber 2.

It is very important to maintain a constant flow of liquid through the apparatus at all times when the furnace 3 is in operation as otherwise the spray wheel 30 and probably other parts of spray drier would be damaged by the hot furnace gases. Provision is therefore made to discharge a stream of water on the spray wheel if the slurry pipes should become clogged or if the regular feed of slurry should be interrupted for any other reason. For this purpose an emergency water pipe 75 (Fig. 6) is located above and in communication with a water channel 76 in the body portion 63 of the distributor. This water channel has a dam 77 across its inner end to prevent the channel from becoming clogged by hardened slurry during normal operation. Preferably the flow of water in the pipe 75 is controlled by a valve that is cross-connected to the slurry feed so that the water valve will open automatically when the flow of slurry is interrupted.

The spray machine 35 is adapted to fit closely within a vertical cylinder 80 in the central well structure 6, and is provided with an outer flange 81 which rests on an inner shoulder 82 in the cylinder 80 when the motor and spray wheel are in operative position. The feed slurry, cooling water, compressed air, oil and emergency water are supplied to the inlet pipes shown on Fig. 6 of the drawings by suitable flexible connections, which are not shown, so that the spray machine 35 can be raised through the cylinder 80 and removed for cleaning or repairs at any time. Electric current is also supplied to the motor by a flexible cable, which is not shown, and a suitable thermocouple well may also be provided if desired. The central cylinder 80 is braced against vibration by a set of brackets 83 which span the annular space 84 between the inner cylinder 80 and the outer, insulated cylinder 85 of the central well structure 6. It will thus be seen that the spray machine is protected from the heat of the furnace, first by a layer of insulation 86 on the inner wall of the furnace, then by the air space 84, then by the water in the cooling jacket 55, and then by the cooling air.

The operation of the apparatus is best shown by a specific example of results which have been obtained herein. A slurry of a hydrated silica-alumina catalyst, containing 87% of silica and 13% of alumina on the dry basis and prepared by suspending in water a precipitated, filtered and washed silica-alumina produced as described in the copending application of K. D. Ashley and A. O. Jaeger, Serial No. 573,078, filed January 16, 1945, now Patent No. 2,478,519, dated August 9, 1949, was supplied at a solids content of about 6.8–8.0%. Natural gas was used as fuel in the furnace 3, which furnace contained 6 gas burners each having a capacity of 6,000,000 B. t. u. per hour. The gas flow was estimated at 2380 lbs. per minute, based on the heat balance. The outlet gas temperature in the pipe 11 was 250° F. The following operating results were obtained when a 9-inch diameter, 45° V-type spray wheel was used.

| Atomizing Speed, R. P. M. | 10,700 open | 10,700 closed | 12,700 open | 10,700 open | 12,700 closed |
|---|---|---|---|---|---|
| Side Inlet Dampers 33 | | | | | |
| Gas Temp. (° F.) in Passage 25 | 710 | 750 | 640 | 640 | 600 |
| Screen Analysis: | | | | | |
| —40 mesh, percent | 100 | 100 | 100 | 100 | 100 |
| —100 mesh, percent | 95 | 97 | 99 | 99 | 100 |
| —200 mesh, percent | 62 | 71 | 84 | 73 | 85 |
| —40 microns, percent | 28 | 31 | 40 | 30 | 43 |
| —20 microns, percent | 6 | 6 | 8 | 7 | 9 |
| —10 microns, percent | 0 | 0 | 0 | 0 | 2 |
| Water Content of Product, percent | 13 | 14 | 13 | 12 | 12 |

What I claim is:

1. In a spray drier having a drying chamber, a furnace superimposed thereon, a central well extending vertically through said furnace and into said drying chamber and a spray machine in the lower portion of said well for introducing liquid material to be dried into said chamber, the improvement which comprises a heat-radiating metal partition between said furnace and said drying chamber, said partition constituting a floor for said furnace but terminating short of said central well to form therewith an annular passage, and gas burners positioned about the lower periphery of said furnace and adapted to discharge flaming hot gases across said partition and into said annular passage, whereby the liquid material to be dried is sprayed into a blanket of furnace gases partially cooled by transmission of heat to said partition and the resulting particles are then exposed to radiant heat from the lower side of the metal partition.

2. In a spray drier having a drying chamber, a furnace superimposed thereon, a central well extending through said furnace and into said drying chamber and a spray machine in the lower portion of said well for introducing liquid material to be dried into said chamber, the improvement which comprises a heat radiating metal partition between said furnace and said drying chamber, said partition constituting a floor for said furnace but terminating short of said central well in a vertical annular baffle which forms with said well an annular passage for surrounding said spray machine with a flow of gases from said furnace, whereby the liquid material to be dried is sprayed into a blanket of furnace gases and the resulting particles are then exposed to radiant heat from the lower side of said metal partition.

3. A spray drier and furnace structure comprising in combination a vertical cylindrical side wall forming a chamber, supporting beams mounted on the top of said wall, a cylindrical well suspended from said beams in the upper portion of said chamber and concentric with the wall thereof, an insulated ceiling hung from said beams across the top of said chamber and surrounding said central well, a set of radial beams below said ceiling having inner ends spaced from said well and supported at their outer ends by said wall and at their inner ends by insulated rods suspended from said supporting beams, and a set of metal floor plates laid across said radial beams and forming with said ceiling and the upper portion of the enclosing cylindrical wall a furnace chamber and with the lower portion of said wall a spray drying chamber, and a vertical cylindrical baffle mounted on the inner ends of said radial beams and forming with said well an annular passage for conducting gases from said furnace into the spray drying chamber.

4. A spray drier comprising in combination a drying chamber, a furnace superimposed thereon, gas burners positioned about the lower periphery of said furnace and adapted to discharge flaming hot gases thereinto, a heat-radiating metal partition constituting a ceiling for said drying chamber and a floor for said furnace positioned adjacent the path of said flaming gases and adapted to absorb a substantial proportion of the heat thereof and transmit it to said drying chamber as radiant heat with a corresponding reduction in the temperature of said gases, a central aperture in said metal partition for admitting the furnace gases so cooled into said drying chamber, and a spray machine positioned in said aperture but protected from direct contact with said gases by a surrounding well structure.

ARMIN G. BRENDEL.

References Cited in the file of this patent

UNITED STATES PATENTS

| Number | Name | Date |
| --- | --- | --- |
| 1,782,822 | Hechenbleikner | Nov. 25, 1930 |
| 2,396,689 | Davis | Mar. 19, 1946 |
| 2,450,599 | Kloda | Oct. 5, 1948 |
| 2,473,035 | Meade et al. | June 14, 1949 |
| 2,478,779 | Pieper | Aug. 9, 1949 |
| 2,506,646 | Komline | May 9, 1950 |
| 2,566,229 | Mackay | Aug. 28, 1951 |
| 2,595,852 | Hopper | May 6, 1952 |